United States Patent
Shih et al.

(10) Patent No.: US 10,142,495 B2
(45) Date of Patent: Nov. 27, 2018

(54) METHOD AND APPARATUS FOR SIMPLIFIED DEVICE DATA COLLECTION

(71) Applicants: Kabushiki Kaisha Toshiba, Minato-ku (JP); Toshiba TEC Kabushiki Kaisha, Shinagawa-ku (JP)

(72) Inventors: Kevin Shih, Irvine, CA (US); Dehua Zhao, Irvine, CA (US)

(73) Assignees: Kabushiki Kaisha Toshiba, Minato-ku (JP); Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 15/455,869

(22) Filed: Mar. 10, 2017

(65) Prior Publication Data

US 2018/0262629 A1 Sep. 13, 2018

(51) Int. Cl.
*H04N 1/00* (2006.01)
*H04W 48/16* (2009.01)
*H04L 12/24* (2006.01)
*H04L 29/12* (2006.01)

(52) U.S. Cl.
CPC ..... *H04N 1/00042* (2013.01); *H04L 41/0213* (2013.01); *H04L 41/22* (2013.01); *H04L 61/3015* (2013.01); *H04N 1/00007* (2013.01); *H04N 1/00084* (2013.01); *H04N 1/00477* (2013.01); *H04W 48/16* (2013.01); *H04N 2201/0039* (2013.01); *H04N 2201/0094* (2013.01)

(58) Field of Classification Search
CPC .......... H04N 1/00042; H04N 1/00007; H04N 1/00084; H04N 1/00477; H04N 2201/0094; H04N 2201/0039; H04L 41/0213; H04L 41/22; H04L 61/3015; H04W 48/16
USPC ....................................... 358/1.15
See application file for complete search history.

(56) References Cited

U.S. PATENT DOCUMENTS

| | | | |
|---|---|---|---|
| 6,662,357 B1 * | 12/2003 | Bowman-Amuah | G06F 8/20 717/120 |
| 2007/0199069 A1 * | 8/2007 | Ohtake | G06Q 10/00 726/20 |
| 2011/0126004 A1 * | 5/2011 | Kawana | H04L 41/28 713/156 |
| 2017/0163843 A1 * | 6/2017 | Ma | H04N 1/32534 |
| 2017/0264779 A1 * | 9/2017 | Hirahara | H04N 1/32539 |

* cited by examiner

*Primary Examiner* — Allen H Nguyen
(74) *Attorney, Agent, or Firm* — Ulmer & Berne LLP (57) ABSTRACT

A system and method for managed device data collection includes a data collector controller for control of monitoring activity of networked multifunction peripherals. A user interface includes a display rendering a plurality of processor rendered interactive user configuration screens. Displayed configuration screens solicit and receive corresponding user input. The configuring screens facilitate setting device user interaction including setting a network address, network connectivity testing, modification of device certificates, changing network settings, and a testing discovery, registration or data transfer mechanism for multifunction peripheral device data collection. A data storage stores user selection data received via rendered configuration screens and the processor outputs stored user selection data as configuration data for data collection from the multifunction peripherals.

14 Claims, 12 Drawing Sheets

```
            ┌─────────────────────────────────┐  800
            │   UI (Collection Configuration) │─804
            └─────────────────────────────────┘
                            │
                            ▼
            ┌─────────────────────────────────┐
            │              OS                 │─808
            └─────────────────────────────────┘
                            │
                            ▼
            ┌─────────────────────────────────┐
            │       Network Interface         │─812
            └─────────────────────────────────┘
```

Network Settings ⟵ 1000

[Edit] ⟵ 1010

| | |
|---|---|
| Host Name : | dcapi3-3.local |
| Address Mode : | DHCP |
| IP Address : | 10.1.54.91 |
| Subnet Mask : | 255.255.255.0 |
| Default Gateway : | 10.1.54.1 |
| Primary DNS : | 10.92.32.21 |
| Secondary DNS : | 10.1.0.31 |
| Proxy Address : | |
| Username : | |
| Password : | |

Network Settings

| | | | | | |
|---|---|---|---|---|---|
| Host Name : | dcapi3-3 | .local | | | |
| Address Mode : | ● DHCP | ○ Static | | | |
| IP Address : | 10 | 1 | 54 | 91 | |
| Subnet Mask : | 255 | 255 | 255 | 0 | |
| Default Gateway : | 10 | 1 | 54 | 1 | |
| Primary DNS : | 10 | 92 | 32 | 21 | |
| Secondary DNS : | 10 | 1 | 0 | 31 | |
| Proxy Address : | | | | | |
| Proxy Username : | | | | | |
| Proxy Password : | | | | | |

[Save] [Cancel]

METHOD AND APPARATUS FOR SIMPLIFIED DEVICE DATA COLLECTION

TECHNICAL FIELD

This application relates generally to a collector for monitoring networked document processing devices. The application relates more particularly to implementation of a Raspberry Pi based stand-alone collector that monitors a plurality of network document processing devices such as multifunction peripherals using simple network management protocol (SNMP).

SUMMARY

In an example embodiment a system and method for managed device data collection includes a data collector controller for control of monitoring activity of networked multifunction peripherals. A user interface includes a display rendering a plurality of processor rendered interactive user configuration screens. Displayed configuration screens solicit and receive corresponding user input. The configuring screens facilitate setting device user interaction including setting a network address, network connectivity testing, modification of device certificates, changing network settings, and a testing discovery, registration or data transfer mechanism for multifunction peripheral device data collection. A data storage stores user selection data received via rendered configuration screens and the processor outputs stored user selection data as configuration data for data collection from the multifunction peripherals.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFP means any of the forgoing.

Operations of document processing devices such as printing, faxing or copying may include depletion of consumables, such as paper, ink or toner. Document processing devices may include counters or other usage monitoring systems to allow for attending to maintenance or servicing operations at known intervals. Monitoring of device operation facilitates replacement of such consumables and facilitates assessing charges for device use. In other situations, monitoring of device operation facilitates imposition of usage quotas.

Given the expense in obtaining and maintain MFPs, MFPs are frequently shared by users and monitored by technicians via a data network. MFPs can be monitored using Simple Network Management Protocol (SNMP). Each brand or model of MFP monitored via SNMP includes a management information base (MIB) with multiple Object Identifiers (OIDs) that define each kind of data on the MFP that can be monitored. Example OIDs can include data such a counters, paper usage, color printing, toner levels and so forth.

However, in order to monitor document processing devices remotely, a server requires information about the document processing devices to be monitored. For example, a server may need to be pre-configured with the Internet Protocol (IP) addresses of each remote document processing devices that is to be monitored. Each time a new document processing device is added to the network, the remote server may need to be updated with configuration data about the added document processing device in order to monitor the device.

DETAILED DESCRIPTION

Figure 1:
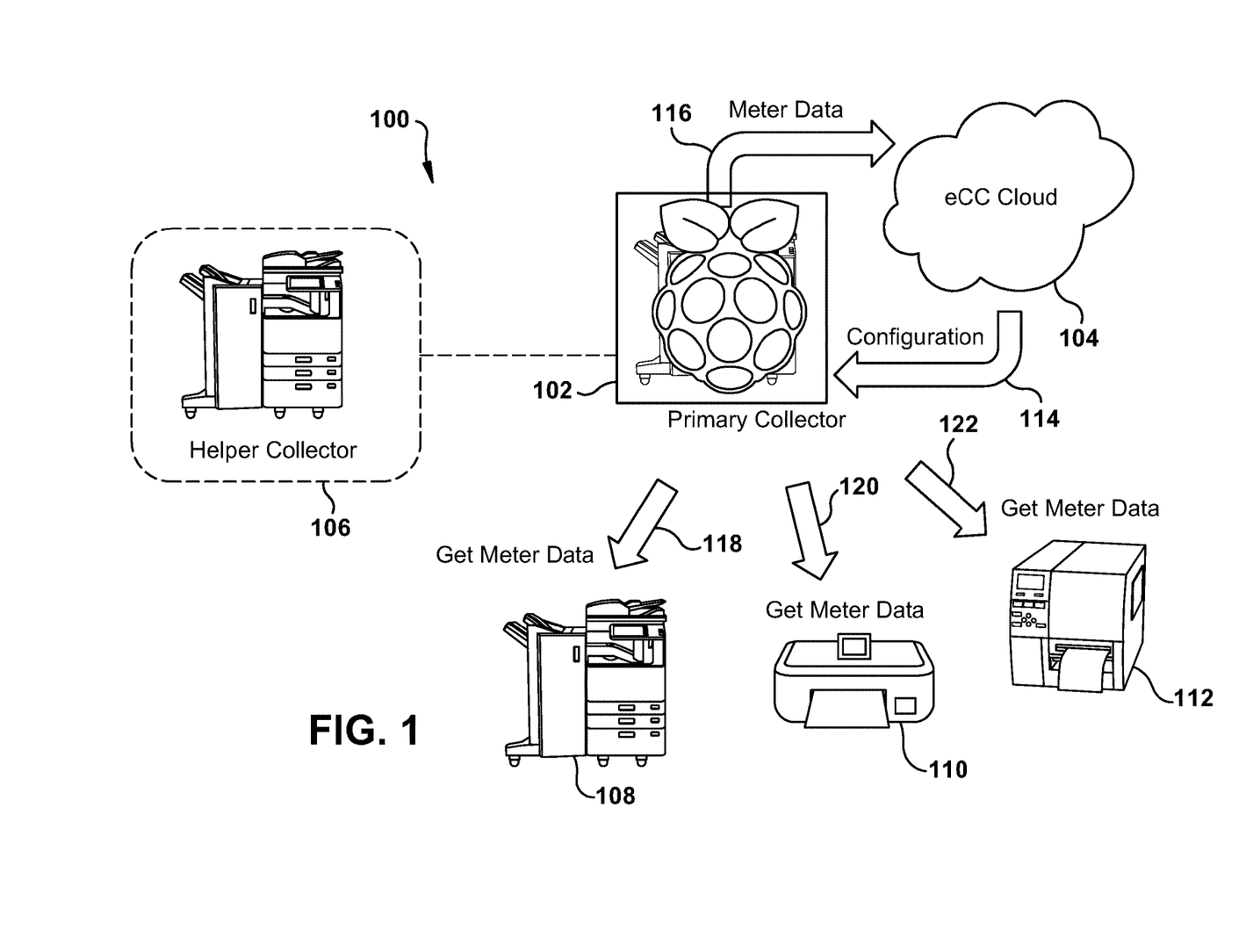
FIG. 1 is a diagram of an example system that includes an SNMP collector and monitored document processing devices according to an embodiment of the disclosure.

Turning to FIG. 1, illustrated is example embodiment of a system 100 that includes a primary collector 102, cloud services 104, a multifunction peripheral or MFP configured as a secondary collector 106, and monitored devices 108, 110, 112. The primary collector 102 obtains configuration information 114 from cloud services 104, for example Toshiba's eBRIDGE CloudConnect. Cloud services 104 suitably reside in one or more network servers. The network suitably comprises a local area network (LAN), a remote local area network (RLAN), a wide area network (WAN) which may comprise the Internet, or any combination thereof.

The primary collector 102 polls the monitored devices 108, 110, 112 to obtain meter data 118, 120, 122. Meter data 118, 120, 122 can include counters, such as page count, paper usage, color printing, consumable usage such as toner levels, service intervals, device maintenance information, service interruptions, malfunctions, and so forth as would be understood in the art. The primary collector 102 can retrieve data periodically or at set or selected intervals.

The primary collector 102 collects the meter data 118, 120, 122 from the monitored devices 108, 110, 112 and forwards the collected meter data 116 to the cloud services 104. Collecting data facilitates enforcement of usage policies or job accounting. Accumulated device data is suitably made available by the cloud services 104 to an administrator or technician. In a configuration, the primary collector 102 can forward collected meter data 116 directly to a user, such as a technician or administrator.

A secondary collector 106, or helper collector, can be configured as a backup collector for the primary collector 102 in the event of a fault or other condition of the primary collector 102. For an example failover operation, see co-pending U.S. application Ser. No. 14/959,478 filed Sep. 21, 2015 and titled "Distributed Primary Device Data Collector with Failover Operation", which is herein incorporated by reference in its entirety. The secondary collector 106 can be an MFP that is executing instructions for collecting data from the monitored devices 108, 110, 112. In a configuration, the primary collector 102 also can obtain meter data from the MFP.

Advantageously, the primary collector 102 can operate in a stand-alone configuration. For example, a customer network may consist of only monitored devices 108, 110, 112. Or a customer network may include one or more MFPs, but the MFPs may not be configured to collect data from monitored device. In these examples, in order to monitor the monitored devices 108, 110, 112, the customer would be required to maintain a server, adding additional costs and labor. Customers could use different operating systems, requiring support not only across operating systems or but also requiring support for different versions of operating systems. A stand-alone primary collector 102 advantageously has no hardware or software dependency based on the customer's network.

The primary collector 102 can comprise dedicated hardware such as a Raspberry Pi device configured to execute instructions for collecting data from monitored devices 108, 110, 112, using for example Simple Network Management Protocol (SNMP) to obtain meter data from each of the monitored devices. A Raspberry Pi device advantageously provides an economical solution for inexpensively monitoring multiple monitored devices 108, 110, 112. As would be understood in the art, a Raspberry Pi device is essentially a reduced footprint personal computer that can be configured to run an application upon startup. The Raspberry Pi device comprises a Raspberry Pi board, a case, and a power supply such as a common 5 Volt power supply or AC adaptor. The Raspberry Pi device advantageously includes a networking port, processor, and memory, as detailed below for FIG. 3 and the accompanying detailed description. The startup application can be loaded into memory, for example using a secure digital or SD card or programmable memory. The configuration for the Raspberry Pi device can be locally configured, or managed through cloud services 104 or both as describe below in greater detail.

In an embodiment, the primary collector 102 can be configured to discover monitored devices 108, 110, 112 in the local network. The following examples detail how a primary collector 102 can operate in a substantially plug-and-play modality. For example, the primary collector 102 can be configured to obtain a dynamically assigned IP address upon boot up and then discover monitored devices 108, 110, 112 within the local subnet. In another example, the primary collector 102 can be configured with an IP address and a subnet to monitor for monitored devices 108, 110, 112. The primary collector 102 can store discovered monitored devices 108, 110, 112 in memory for future use. The primary collector 102 can also be configured with the IP addresses of the monitored devices 108, 110, 112 to monitor. Example configurations also are detailed below.

Figure 2:
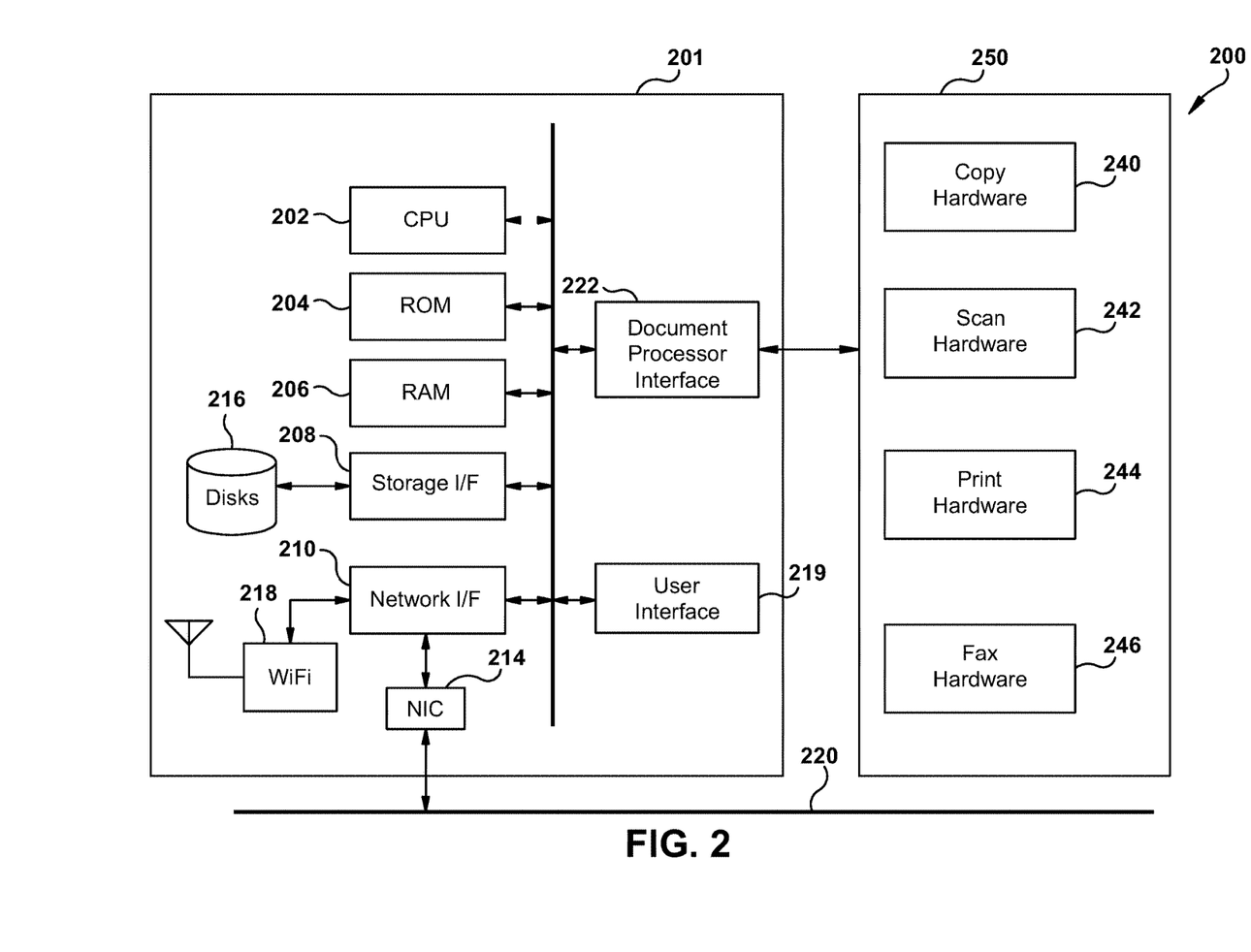
FIG. 2 is a block diagram of an example of components of a multifunction peripheral according to an embodiment of the disclosure.

Turning now to FIG. 2, illustrated are functional components 200 suitably comprising a multifunctional peripheral such as MFP 104 of FIG. 1. Included is controller 201 comprised of one or more processors, such as that illustrated by processor 202. Each processor is suitably associated with non-volatile memory such as ROM 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via wireless network interface 218. Example wireless connections include cellular, Wi-Fi, Bluetooth, NFC, wireless universal serial bus (wireless USB), satellite, and the like. Example wired interfaces include Ethernet, USB, IEEE 1394 (FireWire), Apple Lightning, telephone line, or the like.

Processor 202 can also be in data communication with any suitable user input/output (I/O) interface which provides data communication with user peripherals, such as displays, keyboards, mice, track balls, touch screens, or the like. Hardware monitor 221 suitably provides device event data, working in concert with suitably monitoring systems. By way of further example, monitoring systems may include page counters, sensor output, such as consumable level sensors, temperature sensors, power quality sensors, device error sensors, door open sensors, and the like. Data is suitably stored in one or more device logs, such as in storage 216.

Also in data communication with data bus 212 is a document processor interface 222 suitable for data communication with MFP functional units 250. In the illustrated example, these units include copy hardware 240, scan hardware 242, print hardware 244 and fax hardware 246 which together comprise MFP functional hardware 250. It will be understood that functional units are suitably comprised of intelligent units, including any suitable hardware or software platform.

Figure 3:
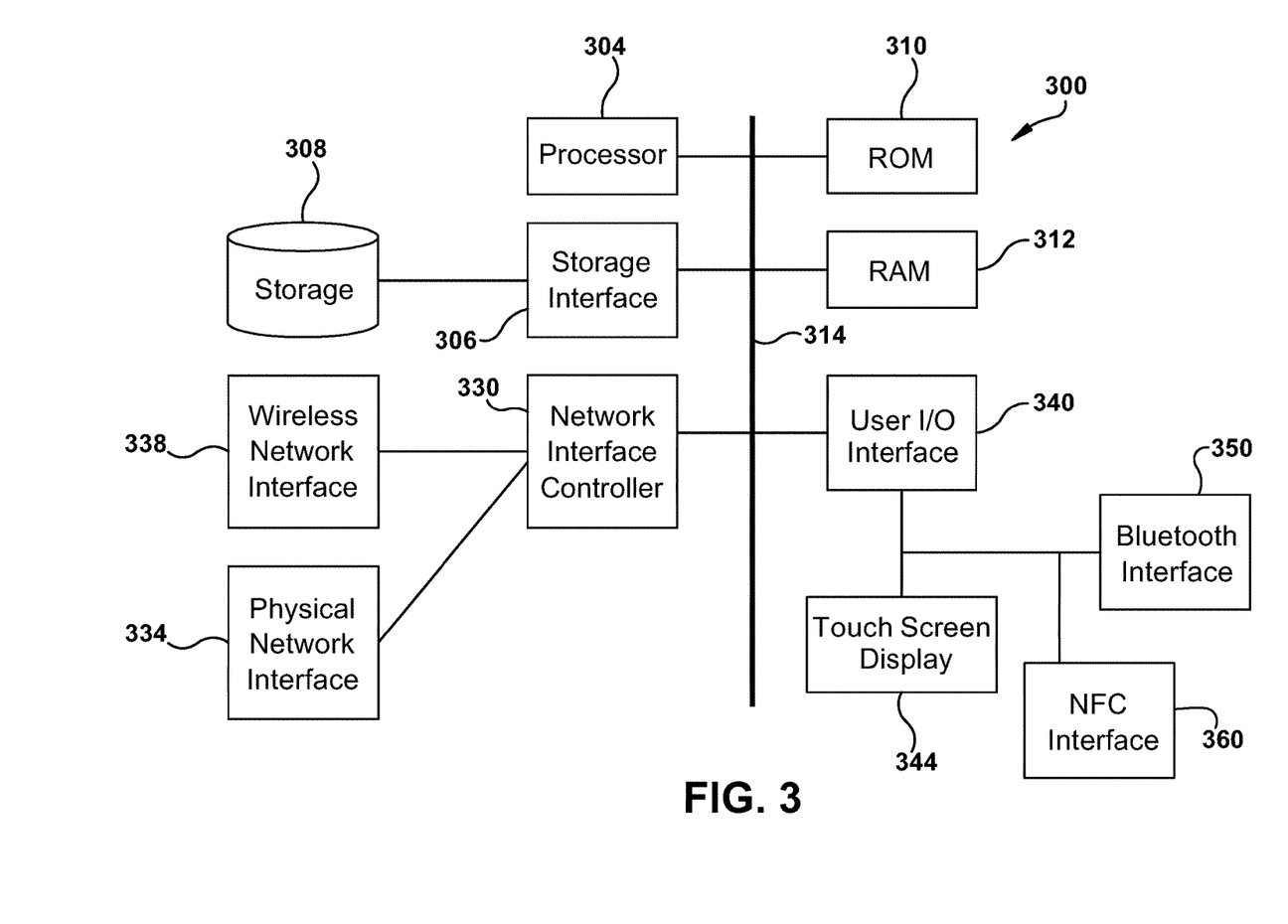
FIG. 3 is a block diagram of an example of components of a computing device according to an embodiment of the disclosure.

Turning now to FIG. 3, illustrated is an example embodiment 300 of a digital computing device such as the primary collector 102 or a networked server associated with the cloud storage 104, and which architecture is suitably implemented in a document processing device such as an MFP controller. Included are one or more processors, such as that illustrated by processor 304. Each processor is suitably associated with non-volatile memory, such as read only memory (ROM) 310 and random access memory (RAM) 312, via a data bus 314.

Processor 304 is also in data communication with a storage interface 316 for reading or writing to a data storage system 318, suitably comprised of a hard disk, optical disk, solid-state disk, or any other suitable data storage as will be appreciated by one of ordinary skill in the art.

Processor 304 is also in data communication with a network interface controller (NIC) 330, which provides a data path to any suitable wired or physical network connection via physical network interface 334, or to any suitable wireless data connection via wireless network interface 338, such as one or more of the networks detailed above.

Processor 304 is also in data communication with a user input/output (I/O) interface 340 which provides data communication with optional user peripherals, such as a display 344, a keyboard 350, a mouse 360 or any other interface, such as track balls, touchscreens, or the like. It will be understood that functional units are suitably comprised of intelligent units, including any suitable hardware or software platform.

Figure 4:
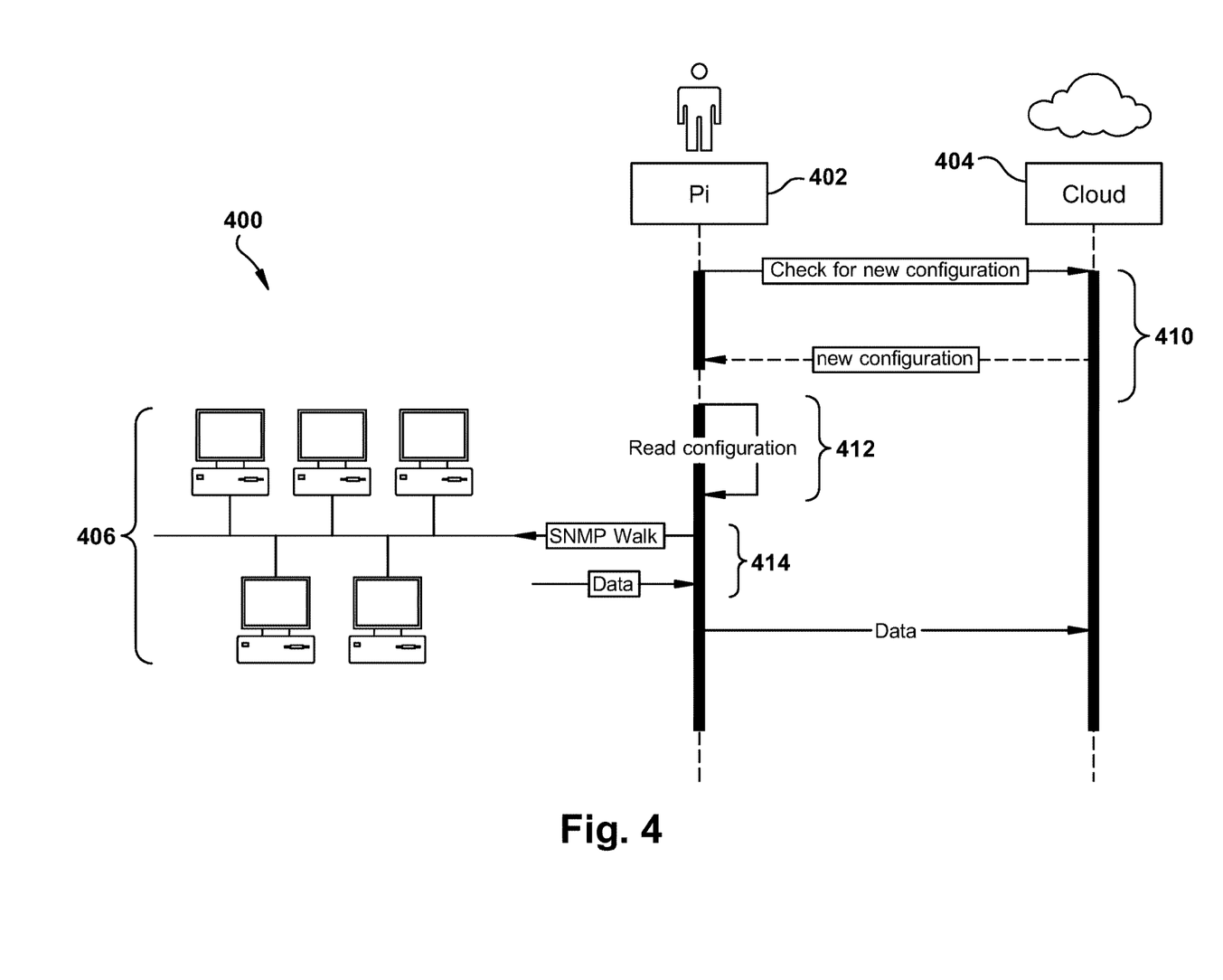
FIG. 4 is a flow diagram of example operations of an SNMP collector.

FIG. 4 illustrates example operations of a system 400 including a collector 402, a cloud server 404, and a monitored network 406 comprising a plurality of network connected document processing devices. When the collector 402 is powered on and boots up, a data collection module in the collector 402 begins executing. In process 410, the collector 402 can optionally check for new configuration data from the cloud server 404. In process 412, the collector 402 reads configuration information from memory and uses any new configuration data received from the cloud server 404 in process 410. In process 414, the collector 402 polls the monitored devices in the monitored network 406. For example, the collector 402 can perform an SNMP walk of the managed information bases (MIBs) of the monitored devices to obtain meter data. In process 416, the collector 402 forwards collected data to the cloud server 404. In a configuration, the collected data can be forwarded directly to a user, such as a technician or administrator associated with one or more of the monitored devices.

Figure 5:
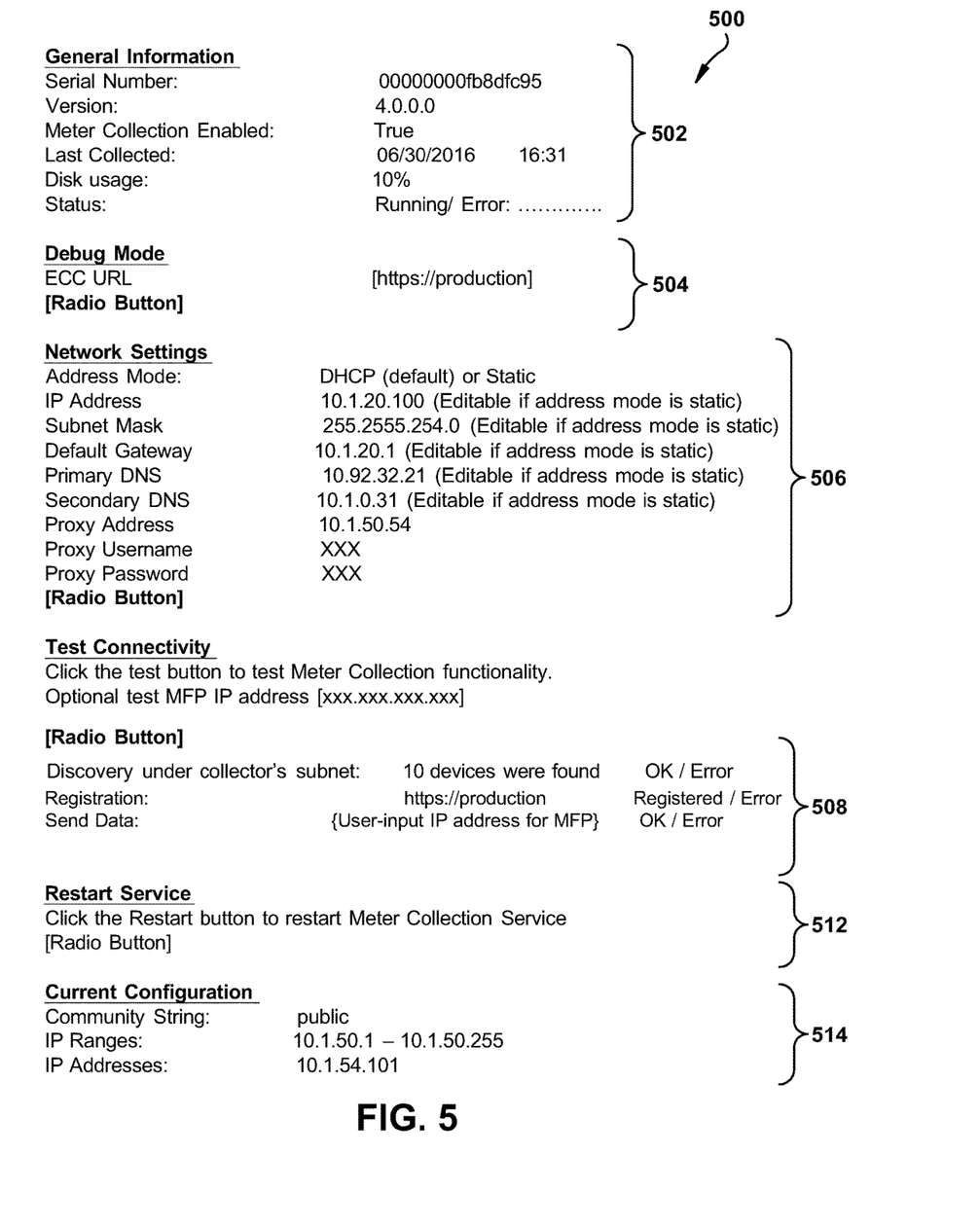
FIG. 5 is a diagram of an example configuration screen for an SNMP collector.

FIG. 5 illustrates and example embodiment of configuration data 500 for a collector. The configuration data 500 can include general information 502 about the collector such as serial number, version, and status. The configuration data 500 can include debugging tools 504 and test tools 508 for verifying whether the collector can communicate with the network server and discover devices to monitor. The configuration data 500 can include a restart tool 512. The configuration data 500 can include network settings 506 for the collector such as an IP address, subnet, gateway, domain name servers, and proxy specifics. The configuration data 500 can include subnets, IP ranges, or individual IP addresses of devices to be discovered or monitored. The configuration data 500 can be changed, for example by selecting a radio button in an associated menu.

Figure 6:
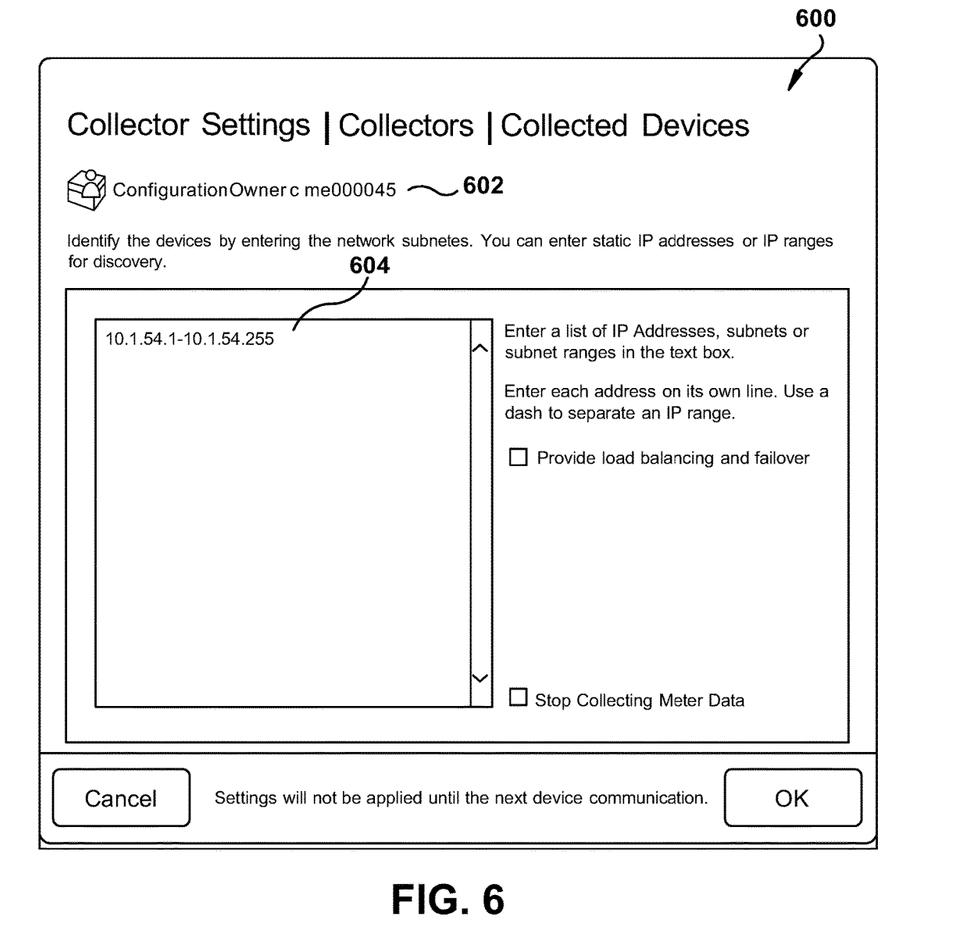
FIG. 6 is a diagram of an example configuration pop-up window for configuring an SNMP collector.

FIG. 6 illustrates an example pop-up configuration window 600 for configuring configuration data for a collector. For example, a user such as an administrator or technician can configure configuration data for a collector using a suitable web-based interface. In the pop-up configuration window 600 of FIG. 6, a user can configure a particular collector 602 to collect data from monitored devices associated with designated IP addresses 604, which can be a subnet, a list of IP addresses, or a range of IP addresses as would be understood in the art.

Figure 7:
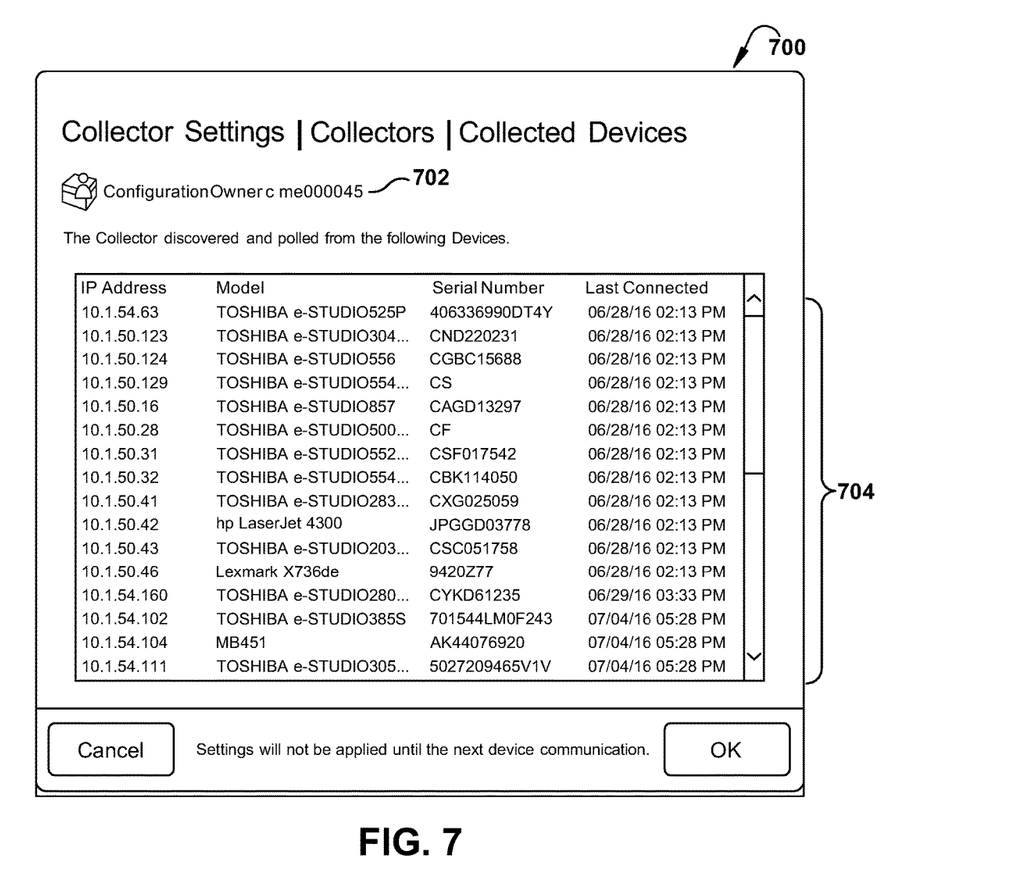
FIG. 7 is a diagram of an example configuration pop-up window for reviewing document processing devices monitored by an SNMP collector.

FIG. 7 illustrates an example pop-up window 700 of devices 704 monitored by a particular collector 702. Clicking on individual devices 704 can present the user with additional information such as the metered data. Other pop-up windows, configuration windows, web pages, application programming interfaces, and so forth can be used to manage and monitor collectors and collected data from monitored devices as would be understood in the art.

The system and method detailed above provides powerful tools for device data collection. Some device users may not have sufficient resources or sophistication to set up or manage SNMP probes with a dedicated collection device. Activities may include changing network settings, changing a cloud URL, updating device certificates or shutting down a dedicated SNMP collection device. The subject application teaches an example embodiment for user control or configuration of a data collector, such as primary collector 102 of FIG. 1. User control or configuration is suitably completed via any networked computer or device. Control is suitably via a network interface including an Internet browser. The data collector includes a configuration including its identification information, in addition to settings controlling interaction with its environment and with networked MFPs. It is understood that a display connected directly to the collector is also suitably used. In the example embodiment, user friendly pre-defined configuration screens are stored and selectively displayed as a prompt for user input to control collector properties. Responses to simple queries, commands or information returned from the user responsive to a configuration screen facilitate updating of the collector's settings file and corresponding collector operation.

Figure 8:
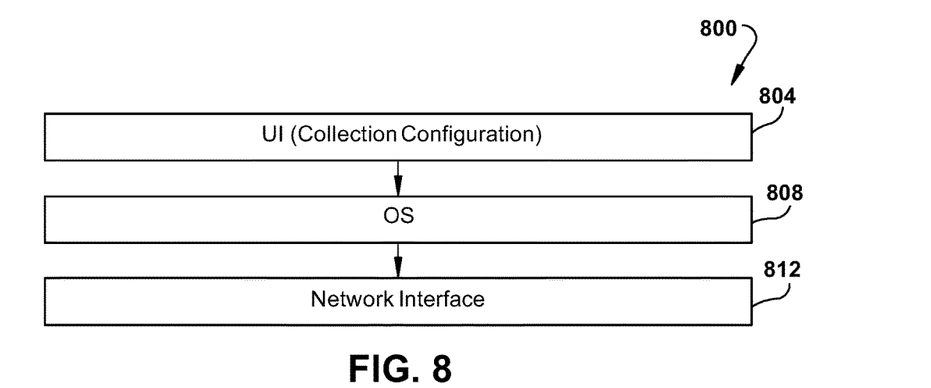
FIG. 8 is an example embodiment of a software module for administrative configuration of networked collector.

FIG. 8 is an example embodiment of a software module 800 for administrative configuration of networked collector such as detailed above. This is suitable for any data device, such as a networked terminal. Device administration module 804 includes a user interface for configuring a data collector. This may be comprised of a web browser or any other suitable interface. Device administration module 804 runs on an operating system 808 for network connection via network interface 812.

Figure 9:
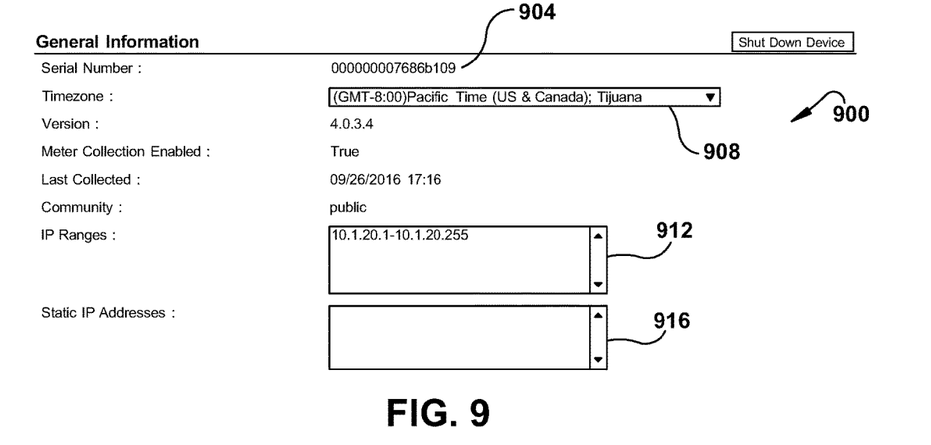
FIG. 9 is a screenshot of an example embodiment of a user configuration screen for a data collector.

FIG. 9 illustrates an example screenshot 900 for generation of a screen to facilitate user control of general information regarding a data collector. Certain items, such as serial number 904 may be unchangeable and displayed for informational purposes. In the example, a user can select a time zone 908 for the collector with drop down menu. The user can directly enter device IP address range information for monitored MFP in IP address field 912. Static IP addresses can be entered in field 916.

Figure 10:
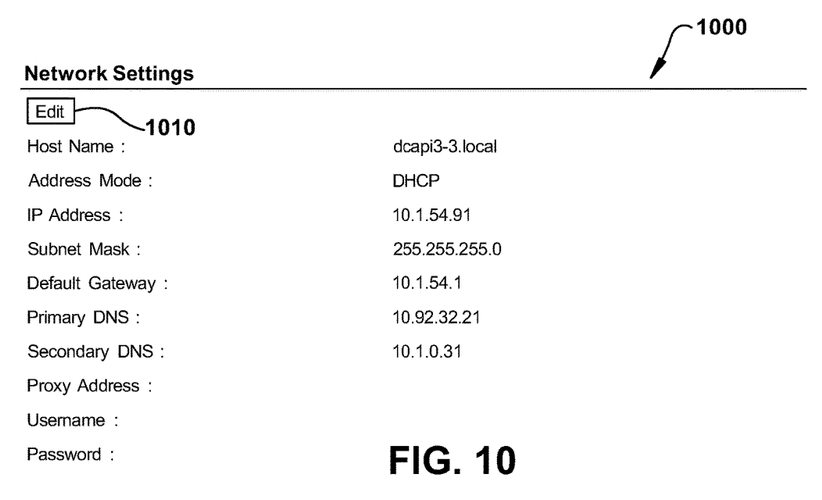
FIG. 10 is a screenshot of an example embodiment of a user configuration screen for a data collector.
Figure 11:
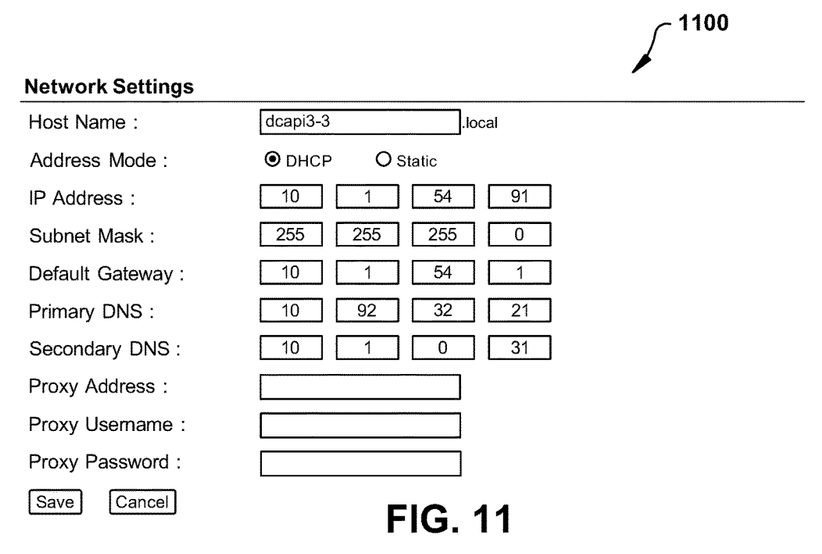
FIG. 11 is a screenshot of an example embodiment of a user configuration screen for a data collector.

FIG. 10 is an example screenshot 1000 showing current network configuration information for a collector device. In the example, no fields are editable. If a user determines that modification need to be made, they can choose to edit the information by selecting edit function 1010, such as by pointing and clicking with a mouse, touchscreen or other suitable selection means. Once editing is selected, FIG. 11 illustrates a screenshot 1100 wherein the fields of FIG. 10 may be altered.

Figure 12:
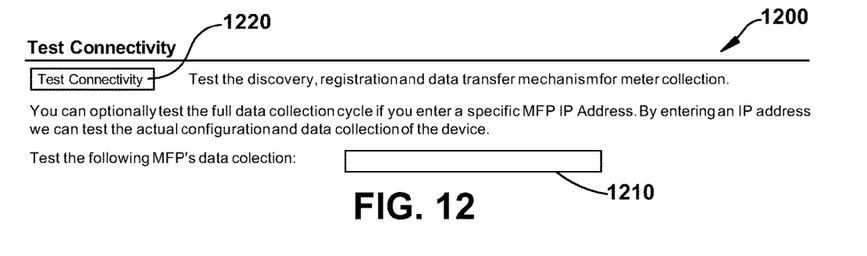
FIG. 12 is a screenshot of an example embodiment of a user configuration screen for a data collector.
Figure 13:
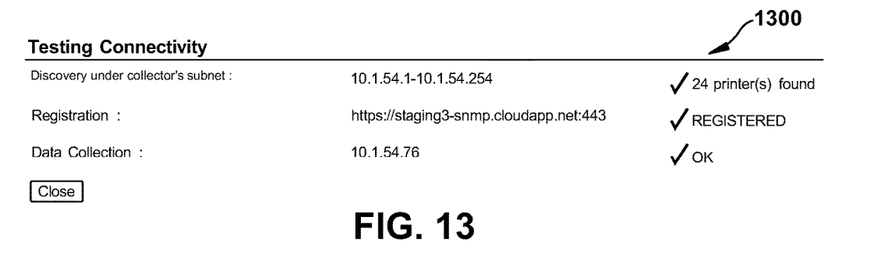
FIG. 13 is a screenshot of an example embodiment of a user configuration screen for a data collector.

FIG. 12 is an example screenshot 1200 of a screen suitable for user directed testing of connectivity. An IP address for testing is entered at field 1210 and a test is commenced when test connectivity button 1220 is selected. Once selected, a testing is commenced and completed and reported as illustrated in the example screenshot 1300 of FIG. 13.

Figure 14:
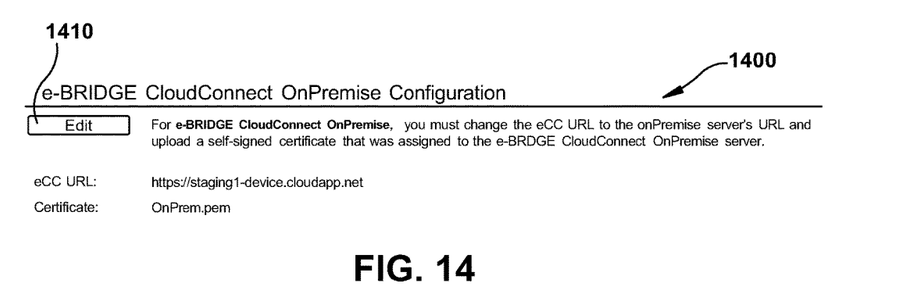
FIG. 14 is a screenshot of an example embodiment of a user configuration screen for a data collector.
Figure 15:
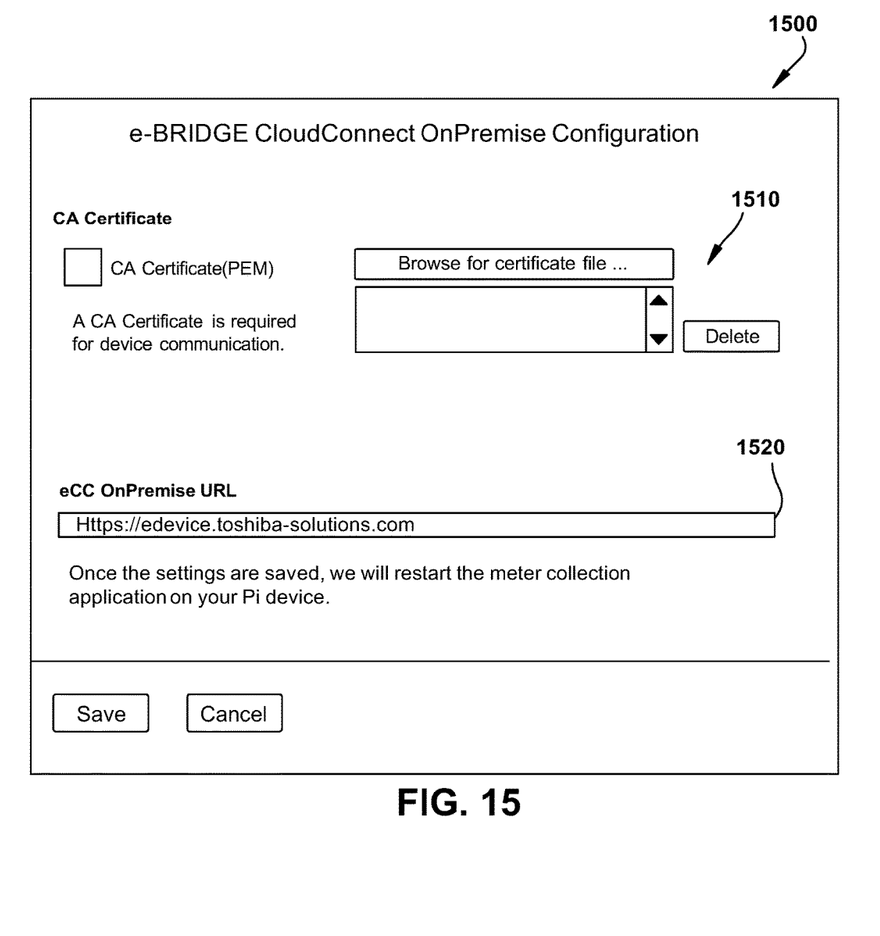
FIG. 15 is a screenshot of an example embodiment for generation of a user configuration screen for a data collector.

FIG. 14 is an example screenshot 1400 for displaying settings for Toshiba's eBRIDGE CloudConnect. Settings are displayed statically. A user can select to edit the displayed settings by selecting edit function 1410. Once the edit function 1410 is selected, screenshot 1500 of FIG. 15 is generated providing for selection, location or addition of device communication certificates at 1510, or specifying of a collector network location at 1520.

Figure 16:
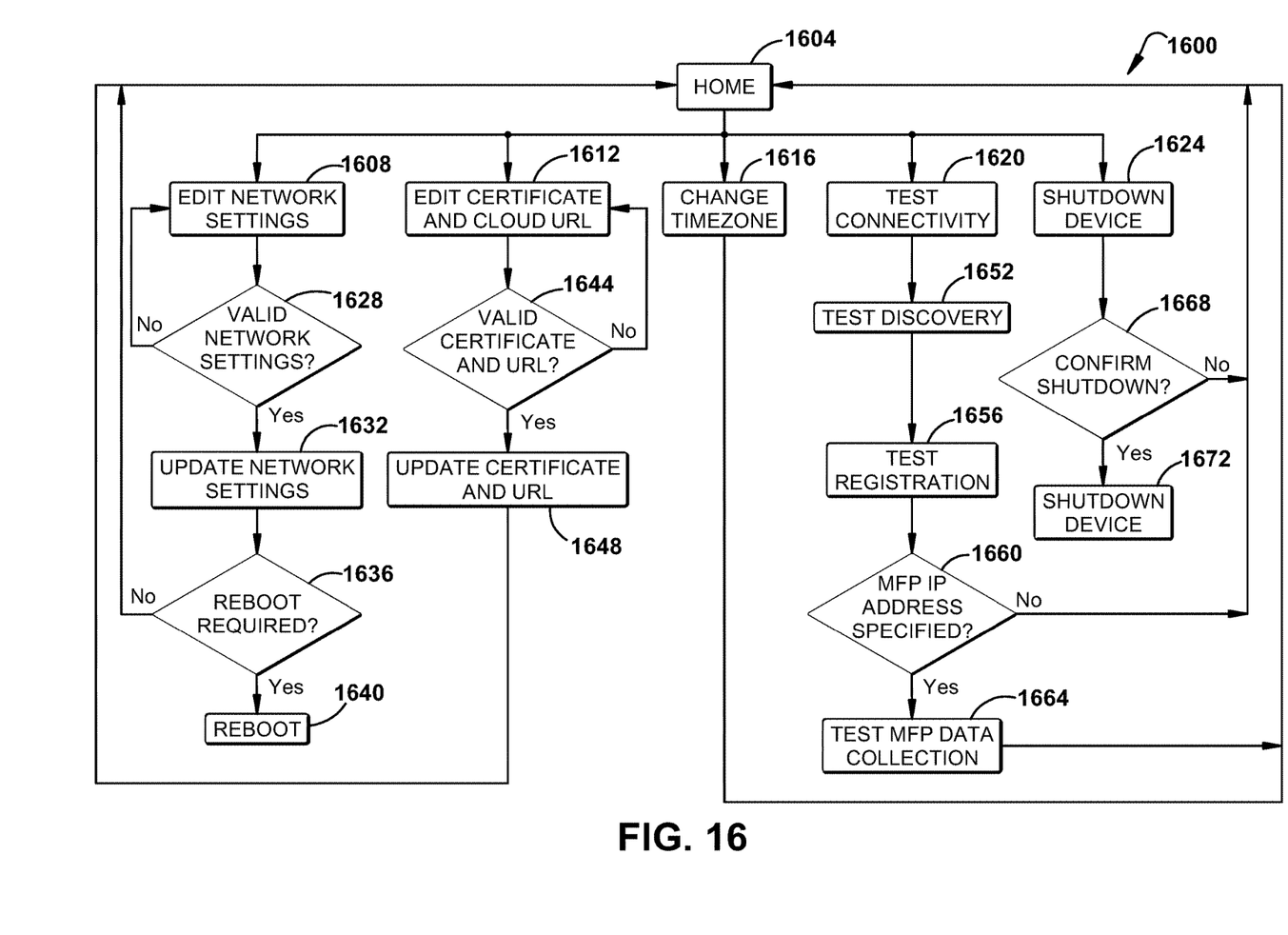
FIG. 16 is a flowchart of an example embodiment of user collector control.

FIG. 16 is a flowchart 1600 of an example embodiment of user collector control, such as via the screenshots noted above. This is suitably accomplished on a device such as primary collector 102 of FIG. 1. The process includes a home state 1604 from which screens are accessible corresponding to edit network settings 1608, edit certificates and cloud control 1612, change time zones 1616, test connectivity 1620 or shut down service 1624.

If settings are to be edited at block 1608, changes are validated at block 1628. If invalid, a return is made to block 1608. If valid the network settings are updated at block 1632. If a reboot is needed at block 1636, this is completed at block 1640. Either way, the process ends up returning to home state 1604.

If certificates or a cloud uniform resource locator or URL are to be edited at block 1612, such edits are validated at block 1644 or returned for reentry at block 1612. Once validated, the certificate and URL are updated at block 1648 and a return to home state 1604 occurs.

If a time zone change is selected at block 1616, a selection is made, suitably via drop down menu 908 if FIG. 9, and the selection is entered and the process returns to home state 1604.

If a connectivity test is selected at block 1620, test discovery is completed at block 1652 and test registration is completed at block 1656. If an MFP IP address is determined to be specified at block 1660, the corresponding MFP is tested at block 1664 and the process returns to home state 1604. If no IP address is specified, there is nothing to test so the process returns to home state 1604.

If shut down service is selected at block 1624, confirmation is solicited at block 1668. If confirmed, shutdown of the device is commenced at block 1672. If not, the process returns to home state 1604.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A data collector controller for control of monitoring activity of networked multifunction peripherals comprising:
    a user interface including a display and a user input;
    a memory including data corresponding to a plurality of interactive user configuration screens;
    a processor configured to selectively render the configuration screens on the display and receive corresponding user input, the configuring screens setting device user interaction including,
        a network address field configured to receive user supplied network address information,
        a user selection option for commencing a network connectivity test,
        a user selection option for specification of device certification certificates,
        a user selection option for modification of device certification certificates,
        a user selection option for modification of a device time zone,
        a field for changing network settings, and
        a user selection for testing discovery, registration or data transfer mechanism for multifunction peripheral device data collection; and
    a data storage configured to store user selection data received via rendered configuration screens,
    wherein the processor is further configured to output stored user selection data as configuration data for data collection from the multifunction peripherals.

2. The controller of claim 1 wherein the processor is further configured to render a configuration screen for user entry of general information data corresponding to a specified data collector.

3. The controller of claim 1 wherein the device-specific data includes a network address range for the multifunction peripherals.

4. The controller of claim 1 wherein the processor is further configured to render a configuration screen for user entry of address information to test collection capabilities of at least one of the multifunction peripherals.

5. The controller of claim 4 wherein tested collection capabilities include one or more of device discovery, device registration or device data transfer capabilities.

6. The controller of claim 5 wherein the processor is further configured to render a configuration screen for user entry of a location of a user-specified device certificate, and wherein the processor is further configured to retrieve the user-specified device certificate into the data storage.

7. The controller of 6 wherein the user-specified device certificate is used for configuring an SNMP data collector.

8. A method for controlling a data collector for monitoring of activity of networked multifunction peripherals comprising:
    displaying a user interface on a display;
    storing, in a memory, data corresponding to a plurality of interactive user configuration screens;
    selectively rendering, via a processor, the configuration screens on the display;
    receiving user input corresponding to the configuration screens including,
        network address information entered via a network address field,
        a user selection for commencing a network connectivity test,
        a user selection for specification of device certification certificates,
        a user selection for modification of device certification certificates,
        a user selection for modification of a device time zone,
        network settings entered into a network settings field, and
        a user selection for testing discovery, registration or data transfer mechanism for multifunction peripheral device data collection;
    storing user selection data received via rendered configuration screens in a data storage; and
    outputting stored user selection data as configuration data to the data collector for data collection from the networked multifunction peripherals.

9. The method of claim 8 further comprising rendering a configuration screen for user entry of general information data corresponding to a specified data collector.

10. The method of claim 8 wherein the configurations data includes a network address range for the multifunction peripherals.

11. The method of claim 8 further comprising rendering a configuration screen for user entry of address information to test collection capabilities of at least one of the multifunction peripherals.

12. The method of claim 11 wherein tested collection capabilities include one or more of device discovery, device registration or device data transfer capabilities.

13. The method of claim 12 further comprising rendering a configuration screen for user entry of a location of a user-specified device certificate, the processor further configured for retrieving the user-specified device certificate into the data storage.

14. The method of 13 wherein the user-specified device certificate is used for configuring an SNMP data collector.

* * * * *